Sept. 1, 1953 W. F. WOOLERY 2,650,854
FLANGE-TYPE SAFETY WHEEL
Filed Oct. 8, 1949
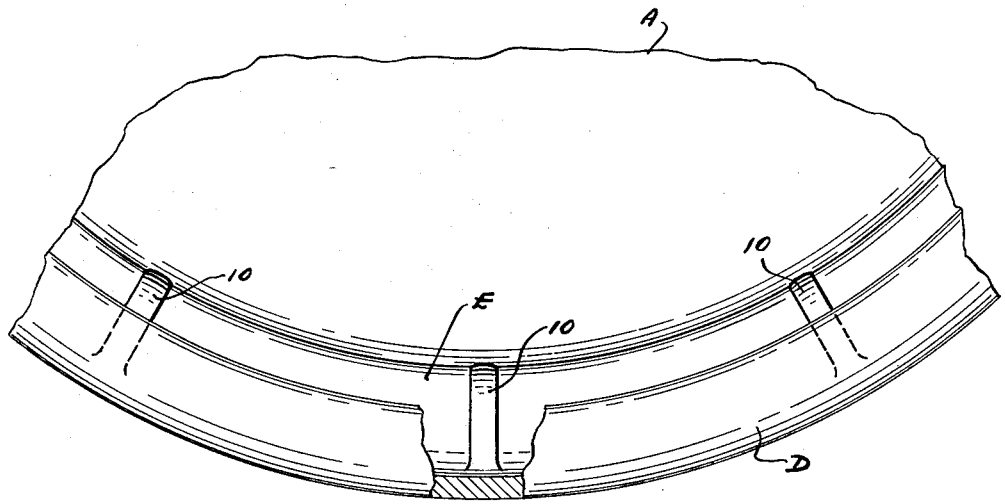
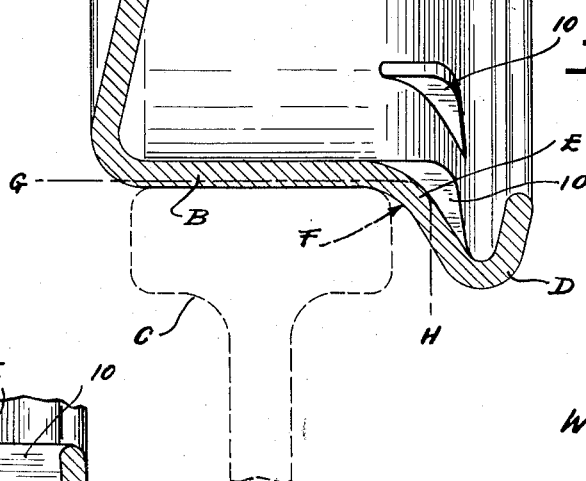
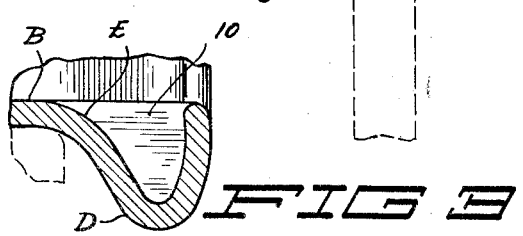
Inventor
WILBER F. WOOLERY
By Carleen + Hogle
Attorneys Patented Sept. 1, 1953

2,650,854

UNITED STATES PATENT OFFICE 2,650,854

FLANGE-TYPE SAFETY WHEEL

Wilber F. Woolery, St. Paul, Minn., assignor to Woolery Machine Company, Minneapolis, Minn., a corporation of Minnesota Application October 8, 1949, Serial No. 120,324

3 Claims. (Cl. 295—34)

1

This invention relates to improvements in the flange-type of wheels used by railroads for work cars, maintenance equipment and analogous rail travelling vehicles.

Wheels of this kind, whether cast or drawn from sheet material, have annular rims with radially outwardly turned flanges along their inner edges to hold the car upon the track. Periodic replacement of the wheels is now required but, even so, accidents occur caused by worn wheels. Maximum wear on the wheels takes place near the junction of the rim and flange causing the flange to break at this point and allowing the car to jump the track. While most wheels are fairly easy to change when worn, the fact remains that the wear is not obvious to the casual eye, while normal human procrastination makes it difficult to ensure that the workmen will attend to the replacement in proper time.

It is the primary object of my invention, therefore, to provide for such wheels safety means which prevent the flange from breaking off even when the junction between the flange and rim has been worn paper thin or even entirely through, thus preventing accidents such as occur with present day wheel constructions.

Another object is to provide a car wheel of this nature which is so constructed as to call attention of the workman to a dangerously worn condition visually and/or audibly as an added safety factor.

Still another object is to provide a wheel which, while being constructed to provide a substantial safety factor as described, will be but little heavier than other wheels.

These and other more detailed and specific objects will be disclosed in the course of the following specification reference being had to the accompanying drawings, in which—

Fig. 1 is an inside elevational view of the lower portion of a car wheel constructed according to my invention, with a portion of the flange partially broken away.

Fig. 2 is a vertical diametrical section through the lower part of the wheel, a portion of a rail being also shown in dotted lines.

Fig. 3 is a fragmentary detail section of a modification of the invention.

Referring now more particularly and by reference characters to the drawing I have illustrated therein only the rim or peripheral portions of a car wheel A, since my invention is concerned with this part and the center construction, connection to axle and the like are of no material importance to this disclosure. As usual, the wheel has an annular rim B of a width such as to properly

2 ride the rail head C and has an outwardly and then inwardly turned flange D which holds the wheel on the rail. The curvature of these parts shown in Fig. 2 is more or less standard and it will be noted that the flange D joins the rim B at a gradually curving junction E which provides clearance at the inside of the rail head. As is well known to those skilled in the art, the greatest wear on the wheel occurs at about the point indicated by the arrow F so that in time the wheel may wear to about the contour indicated by the dot-dash lines G—H. When this occurs, the flange-rim junction E is so weakened that the flange may break off and allow the car to jump the track. In fact, wear can continue until the flange is completely severed from the rim, unless the wheel is inspected with a critical eye and replaced in time.

Fundamentally, my invention provides means for bridging the maximum wear point at the junction of the rim B and flange D, on the inside, so that the flange is supported and held in place even when the junction is worn to the condition indicated by the lines G—H. Such means preferably takes the form of a plurality of radial ribs or fins 10 located on the inside of the wheel around the junction E and extending from the flat (transversely) surface of the rim B outward into the flange D to the point at which it is turned back on itself in an inward direction as shown in Fig. 2. These ribs 10 are spaced evenly around the entire wheel and when the wheel itself is cast may be easily formed integrally during the casting process, while for drawn wheels separate, properly shaped pieces may be welded in place with modern production welding methods with but little added expense. In neither case will the ribs add any particular weight to the wheel since they are relatively small as shown.

A plurality of the spaced ribs 10 is much preferable to a continuous annular thickening of the junction E for a number of reasons. In the first place, weight is a factor, but even more important the spaced elements are safer. When the junction E becomes paper thin due to wear the ribs will be readily and outstandingly visible and will call attention to the dangerous condition. In addition, if the wheel is used in such condition, the thin material will flatten between the ribs and cause a distinctly audible sound as the wheel rolls on the rail, calling attention to the danger in no uncertain fashion. Even when these things occur, however, the ribs by joining the flange and rim will prevent an accident until the wheel is replaced. It is to be noted that the ribs 10 are thickest as measured in a plane radially of the wheel as a whole where they cross the wear point F.

As shown in Fig. 3 I may if desired extend the ribs 10 out straight to meet the inturned edge of the flange D giving some added strength and safety.

I do not, of course, limit myself to the precise shape and spacing of the ribs 10 as herein shown and discussed.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a railway wheel of the type having a rim and an outwardly turned flange on one edge thereof and which is subject in use to greatest wear at the outside of the junction between rim and flange, safety means to hold the flange in place even when the said junction is worn completely through, consisting of a series of elements secured on the inside of the rim and flange and spanning the junction therebetween to tie the flange to the rim, the said elements being thickest measured in a plane radially of the wheel where they cross the rim and flange junction and tapering in opposite directions therefrom.

2. In a railway car wheel of the type having an annular rim with an outwardly turned flange at one edge and which is subject to greatest wear at the outside of the junction of rim and flange, means for giving an operator a visual and audible warning of dangerous wear at this point before the flange breaks off and causes an accident, consisting of a series of spaced thickening elements around the inside of the wheel and extending from immediately inside of the junction of the rim and flange to a point outside of the said junction to hold the flange in place even when worn through to the point where openings appear around the wheel between said thickening elements and thereby visually warn the operator while the sound of said elements intermittently striking the rail give a further audible warning.

3. In a flange-type railway wheel of the character described having a peripheral rim and a circumferential flange along the inside of the rim extending outward radially beyond the rim, the improvement which comprises a plurality of circumferentially spaced rib members secured to and bridging the inside of the junction between the rim and flange to hold the flange in place when said junction is worn, said rib members extending from the inside of the rim out into the flange to points radially outward of the rim itself.

WILBER F. WOOLERY.

References Cited in the file of this patent

UNITED STATES PATENTS

| Number | Name | Date |
|---|---|---|
| 793,311 | Moore | June 27, 1905 |
| 1,257,411 | Sherman | Feb. 26, 1918 |
| 2,130,881 | Frank | Sept. 20, 1938 |
| 2,317,610 | Hollerith | Apr. 23, 1943 |